June 26, 1962 J. W. GRATIAN 3,041,414

SEMICONDUCTOR MAGNETIC PICKUP

Filed Oct. 2, 1958

INVENTOR.
JOSEPH W. GRATIAN

BY T. L. Bowes

ATTORNEY

3,041,414
SEMICONDUCTOR MAGNETIC PICKUP

Joseph W. Gratian, Rochester, N.Y., assignor to General Dynamics Corporation, Rochester, N.Y., a corporation of Delaware Filed Oct. 2, 1958, Ser. No. 764,974
2 Claims. (Cl. 179—100.2)

This invention relates to heads for use in magnetic sound recording and reproducing systems.

It is an object of this invention to provide a new and improved magnetic head.

It is another object of this invention to provide a new and improved magnetic head utilizing semiconductor material.

Yet another object of this invention is to provide a magnetic head utilizing the so-called Hall effect.

In order to accomplish the foregoing objects, I provide a core assembly having a gap across which a magnetic medium may be transported either for the purpose of recording or else for the purpose of reproducing or playing back previously magnetically recorded signals.

While this invention is not limited in scope thereto, the preferred embodiment comprises a core assembly having a pair of gaps. One of these gaps is for the purpose described above. In the second gap there is secured a thin element of suitable semiconductive material such as for example germanium, indium antimonide, or indium arsenide. These materials exhibit a phenomenon which is known as the "Hall effect" according to which a potential difference may be established along one axis of a suitable metallic element or plate when the element is subjected to the influence of a magnetic field perpendicular to the plane of the plate if the plate is also subjected to a current passed through the strip or plate perpendicular to the direction of potential difference in the plane of the element.

The arrangement described is useful as a reproducing head. The addition of a signal input winding suitably associated with the core converts the apparatus to a recording head.

It is thought that these and other objects will be obvious to those skilled in the art and that the invention may be explained best by means of the following description when taken in connection with the attached drawings in which:

FIG. 1 discloses a reproducing head for use with longitudinal recording systems;

Figure 1:
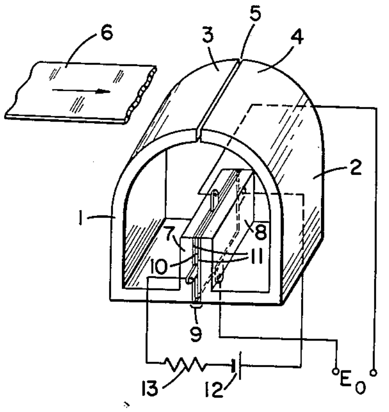

Referring to FIG. 1 of the drawings, there is illustrated one embodiment of my invention. There is provided a core having two identical but oppositely arranged portions 1 and 2 preferably formed from a plurality of laminations of a ferromagnetic material. These portions terminate respectively in pole pieces 3 and 4 arranged to define a first or front air gap 5 of suitable dimensions. A magnetic medium upon which signals to be reproduced have been previously recorded is indicated at 6.

The other ends of core portions 1 and 2 are shaped to provide spaced-apart, parallel plate-like portions 7 and 8 in order to provide a second or back gap 9.

In gap 9 there is disposed a semiconductive material or Hall-effect strip 10 separated from portions 7 and 8 by insulating material 11 suitably secured not only to strip 10 but also portions 7 and 8 by suitable bonding material.

With this arrangement, flux induced in the core portions by the passage of the magnetic medium 6 over air gap 5 establishes a magnetic field in gap 9 which is perpendicular to plate 10.

In order to cause current flow through plate 10, there is provided a source of potential such as battery 12 and a current limiting resistor 13 connected in series between opposite edges of plate 10. The resistance of resistor 13 is preferably large compared to the resistance of the semiconductor plate 10 in order to hold the current substantially constant even though the semiconductor resistance varies substantially with temperature. The output potential $E_0$ is taken off the other pair of opposite edges of the plate as indicated in FIG. 1.

Air gap 9 should be of minimum length. As a playback head, the magnetic medium is the source of flux. All available flux divides between gaps 5 and 9. Since the magnitude of the output potential $E_0$ is directly proportional to the magnetic field in gap 9 and is inversely proportional to the thickness of plate 10, in accordance with the Hall effect theory, it is desirable to utilize the thinnest possible Hall plate and insulation in order to keep gap 9 as short as possible. In the assembly shown in FIG. 1, elements 7 and 8 are substantially coextensive with plate 10 in order to provide as much support as possible for plate 10.

Figure 2:
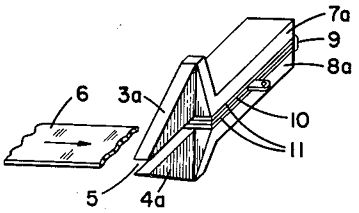
FIG. 2 illustrates a reproducing head for use with perpendicular recording systems.

In FIG. 2 there is shown a second embodiment of my invention particularly adapted for perpendicular recording. The back gap 9 contains a Hall effect device the same as that shown in FIG. 1 and is backed up by core portions *7a* and *8a* corresponding in function to elements or portions 7 and 8 in FIG. 1. Core portions 1 and 2 of FIG. 1, however, have been shaped to provide triangularly shaped pole pieces *3a* and *4a* arranged to provide a gap 5 through which the magnetic medium 6 may be moved.

Figure 3:
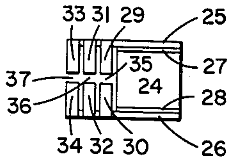
FIGS. 3 and 4 are different views of a multichannel perpendicular magnetic tape pickup.
Figure 4:
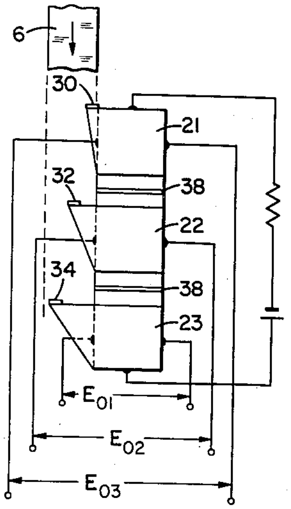

FIG. 3 illustrates a top view and FIG. 4 is a side view of a multiple head embodying the principles of my invention. There is shown a head consisting of three separate elements 21, 22 and 23. Each element comprises a Hall effect element or plate 24 separated from core portions 25 and 26 by suitable layers of insulation 27 and 28, respectively. The core portion of the upper element terminates in pole pieces 29 and 30. The central elements terminate in pole pieces 31 and 32, and the lower elements terminate in pole pieces 33 and 34, thereby providing gaps 35, 36 and 37, respectively, for three different magnetic media, or three different tracks on a single magnetic medium.

In the embodiment shown in FIGS. 3 and 4, separate Hall effect elements are illustrated, these elements being separated by conductive slabs 38. In some applications the conductive separator may not be necessary.

Figure 5:
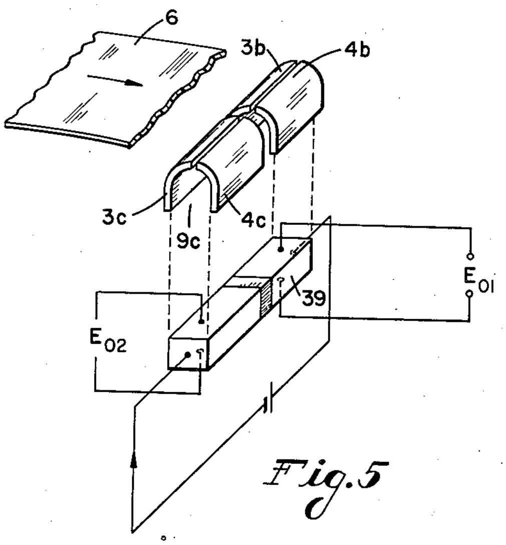
FIG. 5 illustrates a multichannel longitudinal magnetic pickup.

FIG. 5 shows a multiple track arrangement for use in longitudinal recording systems. There is shown therein a plurality of elements having core portions *3b*, *4b* and *3c*, *4c* generally U shaped as shown in FIG. 5. There is shown a slab 39 which may be of an N-type germanium serving as the semiconductor in the back gap *9c*. Slab 39 may be divided into separate semiconductor sections separated by conductive plates, as shown, or used as a single slab, as required.

Figure 6:
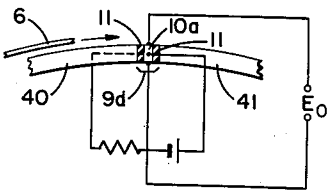
FIG. 6 illustrates a single gap embodiment of my invention.

In FIG. 6 there is illustrated a head having ferromagnetic portions 40 and 41 defining an air gap *9d* in which there is disposed a semiconductor *10a* joined to portions 40 and 41 by layers of suitable insulation 11.

While there has been shown and described what is at present considered to be the preferred embodiment of the invention, modifications thereto will readily occur to those skilled in the art. For example, a high frequency alternating carrier may be used in place of the direct current source across the semiconductor, the carrier being amplitude modulated by the signal flux and then demodulated at the output end in conventional fashion, thereby permitting use of a transformer in the output and providing easier impedance matching when a very low resistivity semiconductor is used. It is not desired, therefore, that the invention be limited to the arrangement shown and described, and it is intended in the appended claims to cover all such modifications as fall within the true spirit and scope of the invention.

What is claimed is:

1. A Hall cell device comprising a longitudinal slab having a constant cross-section, said slab being divided into at least two sections composed of semiconductive material and including an electrically conductive portion connecting said two sections in series with each other, means attached to the ends of said slab for passing a given current through the length of said slab, first magnetic means in cooperative relationship with only one of said sections for applying a first magnetomotive force perpendicular to the length of said one of said sections, second magnetic means in cooperative relationship with only another of said sections for applying a second magnetomotive force perpendicular to the length of said other section and parallel to said first magnetomotive force, a first pair of voltage output terminals connected to opposite sides of said one section to produce a Hall effect output voltage in proportion to the product of said given current and said first magnetomotive force, and a second pair of voltage output terminals connected to opposite sides of said other section to produce a Hall effect output voltage in the same proportion to the product of said given current and said second magnetomotive force, at least the surface of said electrically conductive portion being composed of low resistance material to form shorting means for isolating the Hall effect output voltage of said one section from the Hall effect output voltage of said other section.

2. The device defined in claim 1, wherein said Hall cell device is a multichannel reproduce head, said first magnetic means includes a first ferromagnetic core element having a first gap disposed in flux-transfer relation with one track of a ferromagnetic medium having a first signal recorded thereon, said first core element having a second gap in cooperative relationship with only said one section of said slab, and said second magnetic means includes a second ferromagnetic core element having a first gap disposed in flux transfer with another track of a ferromagnetic medium having a second signal recorded thereon, said second core element having a second gap in cooperative relationship with only said other section of said slab.

References Cited in the file of this patent

UNITED STATES PATENTS

| | | |
|---|---|---|
| 2,866,013 | Reis | Dec. 23, 1958 |
| 2,866,857 | Andrews | Dec. 30, 1958 |
| 2,900,451 | Havstad | Aug. 18, 1959 |
| 2,916,560 | Mathez | Dec. 8, 1959 |

FOREIGN PATENTS

| | | |
|---|---|---|
| 1,132,782 | France | Nov. 5, 1956 |